US008705565B2

(12) United States Patent
Kutt et al.

(10) Patent No.: US 8,705,565 B2
(45) Date of Patent: Apr. 22, 2014

(54) SECURE TRANSMISSION SYSTEM AND METHOD

(75) Inventors: Andres Kutt, Tallinn (EE); Tanel Hiir, Tallinn (EE)

(73) Assignee: Skype, Dublin (IE)

( * ) Notice: Subject to any disclaimer, the term of this patent is extended or adjusted under 35 U.S.C. 154(b) by 250 days.

(21) Appl. No.: 12/832,672

(22) Filed: Jul. 8, 2010

(65) Prior Publication Data

US 2010/0275007 A1  Oct. 28, 2010

Related U.S. Application Data

(63) Continuation of application No. 11/799,452, filed on May 1, 2007.

(30) Foreign Application Priority Data

May 3, 2006 (GB) .................................. 0608752.2

(51) Int. Cl.
*H04J 3/00* (2006.01)

(52) U.S. Cl.
USPC ........... 370/467; 709/203; 709/219; 709/232; 713/150; 715/752; 726/3

(58) Field of Classification Search
None
See application file for complete search history.

(56) References Cited

U.S. PATENT DOCUMENTS

| | | | |
|---|---|---|---|
| 5,931,917 A | 8/1999 | Nguyen et al. | |
| 6,611,533 B1 | 8/2003 | Liao et al. | |
| 7,308,101 B2 | 12/2007 | Wing | |
| 7,650,500 B2 | 1/2010 | Matoba | |
| 7,810,148 B2 | 10/2010 | Ben-Shachar et al. | |
| 7,958,019 B2 | 6/2011 | Ahmed et al. | |
| 2002/0010801 A1* | 1/2002 | Meagher et al. | ............... 709/251 |

(Continued)

FOREIGN PATENT DOCUMENTS

| CN | 101485166 | 7/2009 |
|---|---|---|
| CN | 200780024386.8 | 8/2012 |

(Continued)

OTHER PUBLICATIONS

Office Action from U.S. Appl. No. 11/799,452, date of mailing Jul. 7, 2009.

(Continued)

*Primary Examiner* — Nicholas Sloms
(74) *Attorney, Agent, or Firm* — Sonia Cooper; Jim Ross; Micky Minhas

(57) ABSTRACT

A method is provided for transmitting information from a user to a first network entity over a communications network. The user enters information into a browser executed at a user terminal. The browser generates a first message comprising the information using a first communication protocol for despatch over the network via a network port, the first message including an identifier of the first network entity. A client executed at the user terminal receives the first message before the first message reaches the network port. The first message is wrapped in a second message of a second communication protocol used for transmitting messages between the client and a second network entity. The second message is transmitted to the second network entity over the communications network. The first message is unwrapped from the second message at the second network entity, the identifier of the first network entity translated to a network address of the first network entity and the first message is transmitted to the first network entity over the communications network.

31 Claims, 11 Drawing Sheets

(56) References Cited

U.S. PATENT DOCUMENTS

| | | | |
|---|---|---|---|
| 2002/0042882 A1* | 4/2002 | Dervan et al. | 713/200 |
| 2002/0174068 A1 | 11/2002 | Marsot | |
| 2004/0034776 A1 | 2/2004 | Fernando et al. | |
| 2005/0195799 A1 | 9/2005 | Burne et al. | |
| 2006/0271497 A1* | 11/2006 | Cullen et al. | 705/64 |
| 2007/0211651 A1* | 9/2007 | Ahmed et al. | 370/256 |
| 2007/0291789 A1 | 12/2007 | Kutt et al. | |
| 2010/0275007 A1 | 10/2010 | Kutt et al. | |

FOREIGN PATENT DOCUMENTS

| | | |
|---|---|---|
| GB | 2437791 | 11/2007 |
| GB | 2437791 | 11/2011 |
| JP | 2009535955 | 10/2009 |
| WO | WO-9813796 | 4/1998 |
| WO | WO-2004064357 | 7/2004 |
| WO | WO-2005009019 | 1/2005 |
| WO | WO-2007125412 | 11/2007 |

OTHER PUBLICATIONS

Office Action from U.S. Appl. No. 11/799,452, date of mailing Jan. 11, 2010.

Office Action from U.S. Appl. No. 11/799,452, date of mailing Aug. 9, 2010.

International Search Report, PCT/IB2007/001181, date of mailing Jun. 11, 2007.

"Advisory Action", U.S. Appl. No. 11/799,452, (Mar. 29, 2010), 4 pages.

"Final Office Action", U.S. Appl. No. 11/799,452, (Feb. 25, 2011), 32 pages.

"Non-Final Office Action", U.S. Appl. No. 11/799,452, (Jun. 14, 2012), 31 pages.

Office Action from U.S. Appl. No. 11/799,452, date of mailing Jun. 7, 2011.

"Foreign Issued Patent", Chinese Application No. 200780024386.8, (Aug. 29, 2012), 2 pages.

"Foreign Office Action", Australian Application No. 2007245389, (May 25, 2011), 2 pages.

"Foreign Office Action", Australian Application No. 2007245389, (Apr. 22, 2010), 2 pages.

"Foreign Office Action", Chinese Application No. 200780024386.8, (Jun. 24, 2011), 5 pages.

"International Search Report", Application No. PCT/IB2007/001181, (Jun. 11, 2007).

"Search Report", Application No. GB 068752.2, (Aug. 16, 2007), 1 page.

"Written Opinion", PCT Application No. PCTIB07001181, (Nov. 3, 2008), 5 pages.

Baset, A S., "An Analysis of the Skype Peer-to-Peer Internet Telephony Protocol", *Department of Computer Science Columbia University*, (Sep. 15, 2004), 12 pages.

"Advisory Action", U.S. Appl. No. 11/799,452, (Mar. 1, 2013), 2 pages.

"Foreign Office Action", JP Application No. 2009-508536, (Apr. 24, 2012), 5 pages.

"Non-Final Office Action", U.S. Appl. No. 11/799,452, (Mar. 26, 2013), 33 pages.

"Final Office Action", U.S. Appl. No. 11/799,452, (Jul. 18, 2013), 34 pages.

* cited by examiner

SECURE TRANSMISSION SYSTEM AND METHOD

RELATED APPLICATIONS

This application is a continuation of U.S. application Ser. No. 11/799,452, filed May 1, 2007, which claims priority under 35 U.S.C. §119 or 365 to Great Britain Application No. GB 0608752.2, filed May 3, 2006.

The entire teachings of the above applications are incorporated herein by reference.

FIELD OF INVENTION

This invention relates to a secure transmission system and method, particularly but not exclusively for use in a peer-to-peer telecommunications system.

BACKGROUND OF THE INVENTION

Peer-to-peer telecommunications systems allow the user of a device, such as a personal computer, to make telephone calls across a computer network such as the Internet. These systems are beneficial to the user as they are often of significantly lower cost than traditional telephony networks, such as fixed line or mobile networks. This may particularly be the case for long distance calls. These systems may utilise voice over internet protocol ("VoIP") over an existing network (e.g. the Internet) to provide these services, although alternative protocols can also be used. To use a peer-to-peer telephony service, the user must install and execute client software on their device. The client software provides the VoIP connections as well as other functions such as registration and authentication.

Some calls in a peer-to-peer telephony network may be free to the user, such as calls to other user of the same peer-to-peer system. However, other calls, such as to fixed line telephones or mobiles, may require the user to pay for the service. This therefore requires the user to provide sensitive information to the system, and hence requires a high level of security for transmissions of such data. Many peer-to-peer telephone systems operate a pre-paid account system. In these systems, the user must securely transfer sensitive information to a payment service provider in order to credit their account, and this credit is then used during the calls made. Once the credit runs out, the user must again securely transfer sensitive information to the payment service provider to credit more money into their account in order to continue using the service. In alternative systems, the user may be invoiced for the amount of calls they have made over a period of time, or may be required to make a fixed payment regardless of the number of calls made.

In existing peer-to-peer telephony systems, the user can securely transfer sensitive data to a payment service provider by opening a web browser program and navigating to the site of the telephony system operator. From this web page the user can select links to make a payment to their account. The user can then enter credit card or other payment information into the web page. The web browser can use known secure protocols for sending the sensitive information to a payment service provider. The disadvantage of this method is that it requires the user to open a separate program on their terminal (i.e. a web browser) in order to make a payment. The user may also be required to proceed through several clicks of the webpages before reaching the correct page. Furthermore, the user must have access to the World Wide Web in order to make such a payment. However, in some circumstances the user may be blocked from accessing the web for security reasons, but would otherwise still be able to use the peer-to-peer telephony service.

From a usability perspective, it would be desirable for the user of the telephony system to be able to make secure payments for services directly from the client software running on the user's terminal. This is because the user directly associates the client program with the telephony service. Furthermore, by allowing secure payment from within the client program, this avoids the need for the user to open other programs in order to securely transmit sensitive information for the service. For example, as discussed hereinbefore, if the user needs to transmit the sensitive information over the Internet, the user may be required to open a browser on his or her terminal and then enter the correct address of the web site through which they should pay before they can enter any payment details. This process can be prone to user error, and hence frustration on the part of the user. In addition, some users may also be suspicious of entering sensitive information on web site pages, and may have a greater level of trust in the client software provided by the operator of the telephony service. The client, however, already knows the identity of user, and this information can therefore be passed to the payment provider without having to prompt the user for an additional username and password, thereby making the payment process more straightforward for the user.

However, any information transmitted over the network related to sensitive information must be secure. In particular, sensitive information should not be sent unencrypted. A conventional way of sending sensitive information is using a hypertext transfer protocol ("HTTP") message format, such as HTTP secure ("HTTPS"), which encrypts data using a version of the secure socket layer ("SSL") or transport layer security ("TLS") protocols. However, any HTTP messages sent from the client software are easy to detect and block resulting in a failure to deliver the HTTP message and thus the encrypted data. The detection and blocking of HTTP messages may be done by third parties or firewalls. For example, some companies see the ability to access arbitrary webpages as a security risk and may therefore block HTTP. However, the telephony service provider does not pose a security risk as its content would be obtained from trusted sources. Furthermore, some companies or third parties may wish to block the peer-to-peer telephony service itself. Whilst the actual telephony traffic may be difficult to detect, the client may make specific HTTP requests to perform its tasks. These requests can therefore be detected and allow the terminal running the client to be determined, and the requests blocked.

SUMMARY OF THE INVENTION

There is therefore a need for a secure transmission system and method in a network, such as the Internet, that enables the transmission of sensitive information from a local client to a web-based service provider.

According to one aspect of the present invention there is provided a method of transmitting information from a user to a first network entity over a communications network, comprising the steps of: the user entering information into a browser executed at a user terminal; the browser generating a first message comprising the information using a first communication protocol for despatch over the network via a network port, the first message including an identifier of the first network entity; receiving the first message at a client executed at the user terminal before the first message reaches the network port; wrapping the first message in a second message of a second communication protocol used for transmitting messages between the client and a second network entity; transmitting the second message to the second network entity over the communications network; and unwrapping the first message from the second message at the second network entity, translating the identifier of the first network entity to a network address of the first network entity and transmitting the first message to the first network entity over the communications network.

In one embodiment the method further comprises the step of encrypting the information in the first message after receiving the first message at the client. In another embodiment the method further comprises the step of receiving the first message transmitted by the second network entity at the first network entity. In another embodiment the method further comprises the step of decrypting the information in the first message, after it is received at the first network entity. In another embodiment the step of encrypting is performed using an encryption key provided by the first network entity. In another embodiment the method further comprises the step of the first network entity periodically transmitting the encryption key to the second network entity.

In another embodiment the method further comprises the steps of: transmitting a third message to the second network entity from the first network entity, responsive to receiving the first message; receiving the third message at the second network entity and, responsive thereto, fetching a webpage from a server; wrapping the webpage in a fourth message of the second communication protocol; transmitting the fourth message to the client over the communications network; unwrapping the webpage from the fourth message at the client and passing the webpage to the browser; and displaying the webpage to the user in the browser. Preferably, the third message is a redirect message.

In another embodiment the step of wrapping the first message in a second message of a second communication protocol comprises the step of adding a header and a footer to the first message.

Preferably, the first communication protocol is a hypertext transfer protocol. Preferably, the first network entity is a payment service provider. Preferably, the communications network is the Internet. Preferably, the second network entity is a Skype backend server. Preferably, the information is payment information.

According to another aspect of the present invention there is provided a system for transmitting information from a user to a first network entity over a communications network, comprising: a browser executed at a user terminal, the browser comprising means for receiving information entered by the user, and means for generating a first message comprising the information using a first communication protocol for despatch over the network via a network port, the first message including an identifier of the first network entity; a client executed at the user terminal comprising means for receiving the first message at the client before the first message reaches the network port, means for wrapping the first message in a second message of a second communication protocol used for transmitting messages between the client and a second network entity, and means for transmitting the second message to the second network entity over the communications network; and the second network entity comprising means for unwrapping the first message from the second message at the second network entity, means for translating the identifier of the first network entity to a network address of the first network entity, and means for transmitting the first message to the first network entity over the communications network.

In one embodiment the client further comprises means for encrypting the information in the first message after receiving the first message at the client. In another embodiment the first network entity further comprises means for receiving the first message transmitted by the second network entity. In another embodiment the first network entity further comprises means for decrypting the information in the first message, after it is received at the first network entity. In another embodiment the encryption is performed using an encryption key provided by the first network entity. In another embodiment the first network entity further comprises means for periodically transmitting the encryption key to the second network entity.

In another embodiment the first network entity further comprises means for transmitting a third message to the second network entity, responsive to receiving the first message. In another embodiment the second network entity further comprises means for receiving the third message and, responsive thereto, fetching a webpage from a server, means for wrapping the webpage in a fourth message of the second communication protocol, and means for transmitting the fourth message to the client over the communications network. In another embodiment the client further comprises means for unwrapping the webpage from the fourth message and passing the webpage to the browser. In another embodiment the browser further comprises means for displaying the webpage to the user. Preferably, the third message is a redirect message.

In another embodiment the means for wrapping the first message in a second message of a second communication protocol comprises means for adding a header and a footer to the first message.

Preferably, the first communication protocol is a hypertext transfer protocol. Preferably, the first network entity is a payment service provider. Preferably, the communications network is the Internet. Preferably, the second network entity is a Skype backend server. Preferably, the information is payment information.

According to another aspect of the present invention there is provided a user terminal comprising: a browser executed at the user terminal, the browser comprising means for receiving information entered by a user, and means for generating a first message comprising the information using a first communication protocol for despatch over a communications network via a network port, the first message including an identifier of a first network entity; and a client executed at the user terminal comprising means for receiving the first message at the client before the first message reaches the network port, means for wrapping the first message in a second message of a second communication protocol used for transmitting messages between the client and a second network entity, and means for transmitting the second message to the second network entity over the communications network.

According to another aspect of the present invention there is provided a network entity comprising: means for unwrapping a first message of a first communication protocol from a second message of a second communication protocol transmitted by a client executed at a user terminal to the network entity over a communications network, the first message including an identifier of a further network entity; means for translating the identifier of the further network entity to a network address of the further network entity; and means for transmitting the first message to the further network entity over the communications network.

According to another aspect of the present invention there is provided a computer program product comprising program code means which when loaded into a computer controls the computer to carry out the method above.

BRIEF DESCRIPTION OF THE DRAWINGS

For a better understanding of the present invention and to show how the same may be put into effect, reference will now be made, by way of example, to the following drawings in which.

DETAILED DESCRIPTION OF THE INVENTION

Figure 1:
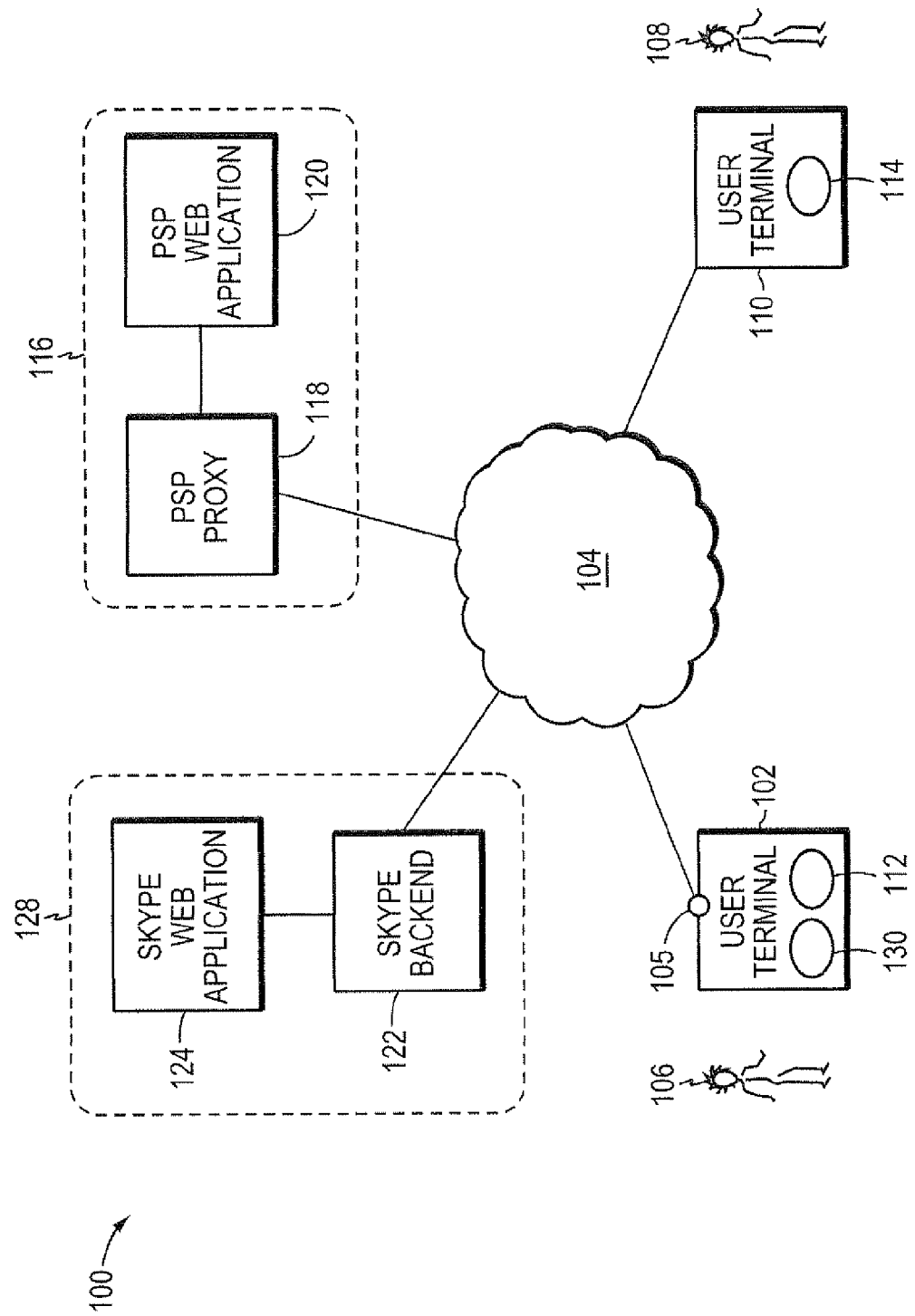
FIG. 1 shows a peer-to-peer telephony system with the secure transfer of information to a payment service provider.

Reference will first be made to FIG. 1, in which is shown a peer-to-peer telephony system 100 with the secure transfer of information to a payment service provider.

A user terminal 102 is shown connected to a network 104. The user terminal may be, for example, a personal computer, personal digital assistant, a suitably enabled mobile phone or other device able to connect to the network 104. The user terminal 102 is connected to the network 104 via a network port 105, and may be via a cable (wired) connection or a wireless connection. The network 104 may be a network such as the Internet.

A user 106 of user terminal 102 can make a telephone call to second user 108 of a second user terminal 110 across the network 104. The user terminal is running a client 112, provided by the operator of the peer-to-peer telephony system. The client 112 is a software program executed on a local processor in the user terminal 102. To initiate the call, the user 106 can click on the contact listed for the second user 108 displayed in the client 112, or can alternatively type in a telephone number or username for the second user 108. The client 112 then sets up the call to the second user 108. The telephone call may be made using VoIP, in accordance with methods known in the art, such as disclosed in WO 2005/009019. The telephone call may comprise voice, video, instant messaging ("IM"), or a combination thereof.

The second user terminal 110 may be directly connected to the network 104 (as shown in FIG. 1), or may be connected to a different network such as the public switched telephone network ("PSTN") or a mobile network (not shown in FIG. 1). If the second user terminal is connected to the network 104, then it may be running a client program 114 provided by the operator of the telephony system, similar to the client 112 running on the first user terminal 102. If connected to the PSTN, the second user terminal may be a fixed line telephone, and if connected to a mobile network, the second user terminal may be a mobile telephone.

In order to be able to make telephone calls, the user 106 must be suitably registered and authenticated. Furthermore, the user 106 must also be able to pay for the telephone services. Sensitive payment information therefore needs to be transferred from the user 106 to a payment service provider ("PSP") across the network 104. As the payment information is of a sensitive nature, the payment system needs to be very secure. If there is sensitive information flowing though the telephony system servers, then the system must comply with payment card industry ("PCI") rules enforced by credit card companies. Complying with these rules is expensive and takes time. In addition, if the servers of the telephony system are storing sensitive payment information, then they are likely to become a target for attack by hackers. There is therefore significant benefit in reducing the number of system entities that are exposed to sensitive information and need to be PCI compliant. Furthermore, the secure transmission of the sensitive information needs to be as simple and usable as possible from the point of view of the user.

As stated previously, it is significantly simpler for the user of the telephony system to be able to securely pay for services directly using the client 112 running on the user terminal 102. In addition, this allows the client to be the only part of the telephony system that needs to be PCI compliant. As will be described hereinafter, the rest of the system just sees encrypted information, and has no knowledge of the information content. Therefore, the rest of the system is not directly dealing with sensitive information and does not need to be PCI compliant. The expense of making the client PCI compliant is an order of magnitude cheaper than maintaining a secure server environment. FIG. 1 shows the entities in the system 100 that allow the user 106 to securely pay for telephony services through the client 112. The user 106 makes the payment to a payment service provider 116. The PSP 116 is a private network that is connected to network 104, and may comprise a PSP proxy 118 and a PSP web application 120. The PSP proxy 118 is a software program running on a processor in a server, which is connected between the PSP web application 120 and the network 104, and is responsible for decrypting information before it is presented to the PSP web application 120. The PSP web application 120 is a software application executed on a processor in a server. The PSP proxy 118 and PSP web application 120 may be located on separate servers, or may be running on the same server. The PSP 116 may be operated by a different operator than the telephony service.

Also connected to the network 104 are a Skype backend server 122 and a Skype web application 124. The Skype backend server 122 and the Skype web application 124 may be located within the private network 128 of the operator of the telephony system. The Skype backend server 122 and the Skype web application 124 may be geographically co-located, or may be geographically separated. The Skype backend server 122 is located between the Skype web application 124 and the network 104, and is responsible for exchanging messages between the Skype web application 124 and the client 112. The Skype backend 122 and the client 112 communicate using a proprietary Skype protocol, and do not use HTTP. This is to avoid the detection and blocking of HTTP messages by third parties and firewalls, as discussed previously. Furthermore, the Skype backend 122 also blocks HTTP.

The user terminal 102 has web browsing software 130 installed on it, in addition to the client 112. The web browser 130 is capable of being utilised as part of the user interface of the client 112, and can be controlled by the client 112 to display hypertext markup language ("HTML") webpages to the user 106.

Figure 2A:
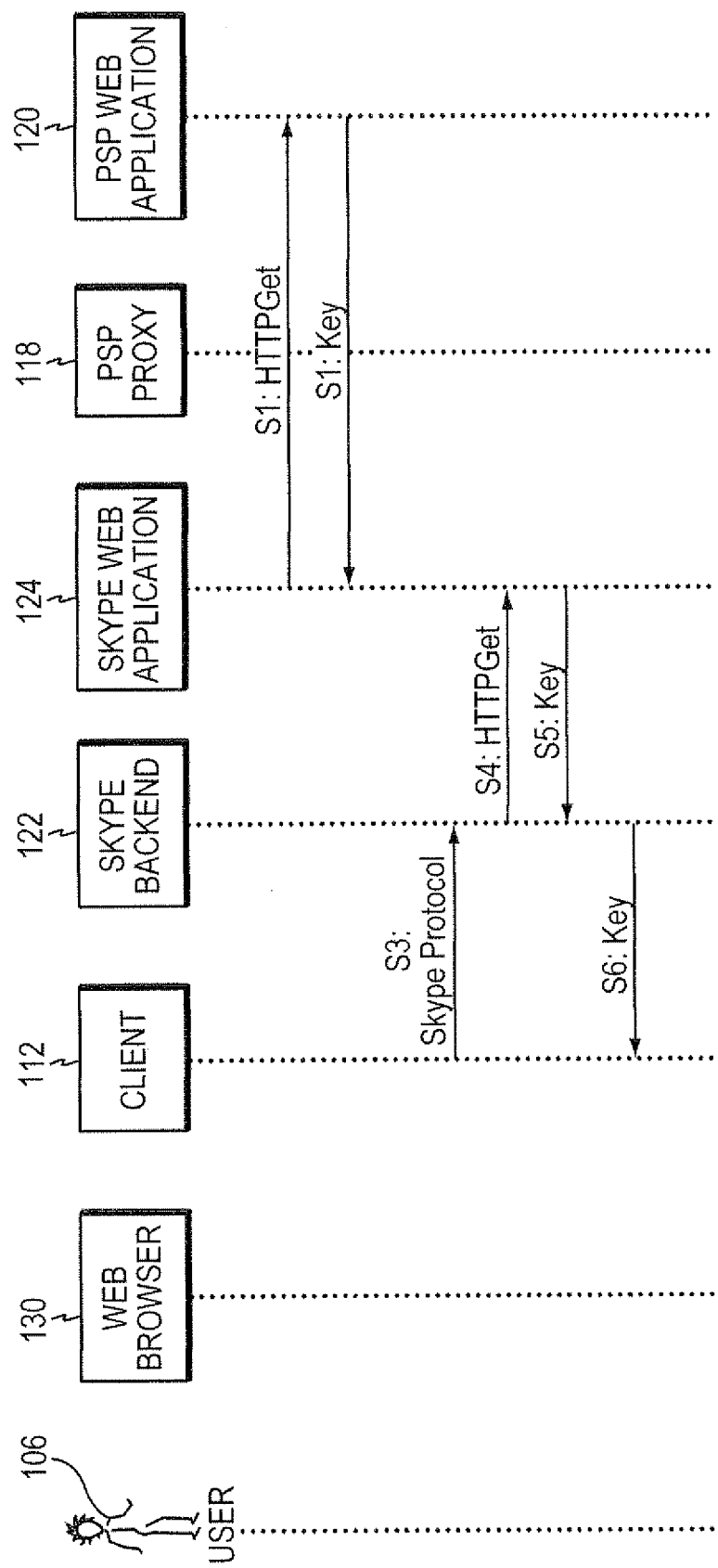
FIG. 2A shows the messages exchanged in the system of FIG. 1 for the maintenance of key information.

The operation of the system 100 shown in FIG. 1 will now be described with reference to FIGS. 2A-2E. Referring first to FIG. 2A, this figure shows the maintenance of cryptography key information at the client 112. In step S1, the Skype web application 124 will periodically query the PSP web application 120 for a new version of its public key. The message in step S1 is in the form of a HTTP Get request specifying the uniform resource locator ("URL") of the key located at the PSP web application. In response to this request, the PSP web application 120 will return the public key to the Skype web application 124 in step S2. The above two steps are performed periodically and independently of any other operations to ensure that the Skype web application 124 always has an up-to-date copy of the public key.

The client 112 periodically polls the Skype backend 122 using the Skype protocol for a new version of the public key in step S3. The Skype backend server 122 forwards the request to the Skype web application 124 in the form of an HTTP Get request specifying the URL of the key stored in the Skype web application in step S4. The Skype web application 124 returns the key to the Skype backend server 122 in step S5, and this is passed to the client 112 in step S6 using the Skype protocol. The above four steps are performed periodically, without the user being aware of its operation, in order to ensure that the key information is always up to date in the client 112.

Therefore, as a result of the steps performed in FIG. 2A, the client 112 has a recent copy of the public key of the PSP web application 120 for use in the payment process, as described in more detail hereinbelow.

Figure 2B:
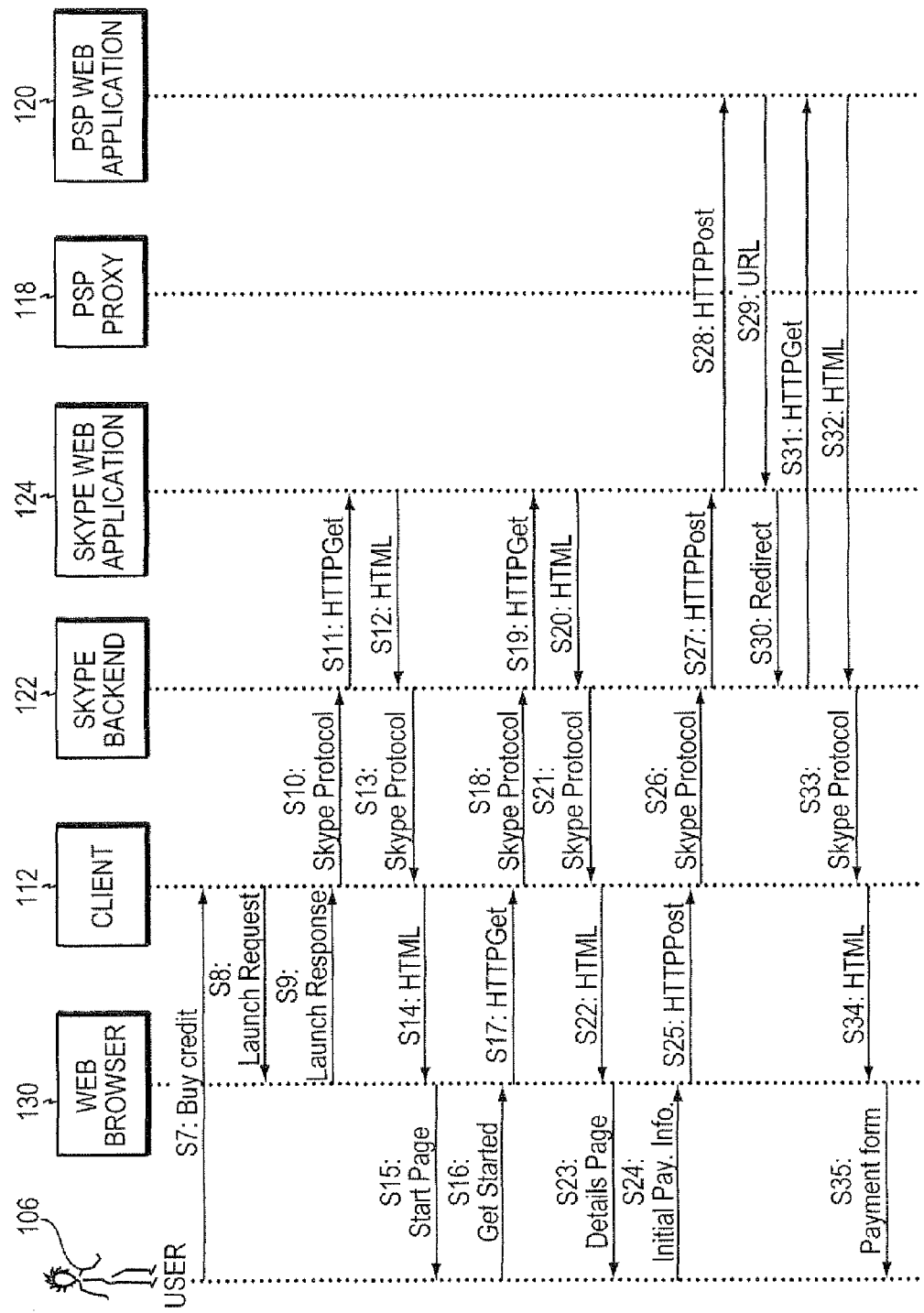
FIG. 2B shows the messages exchanged in the system of FIG. 1 for the initiation of a payment.

FIG. 2B shows the user 106 initiating the payment process. In step S7, the user 106 clicks a button which may be labelled "Buy Skype Credit" (although other labelling is possible) displayed in the client 112, indicating to the client 112 that the payment process should be started. In step S8, the client 112 initiates web browser 130 control, in which the client opens the web browser within the client user interface, and when complete a signal is returned to the client 112 in step S9.

Associated with the button "Buy Skype Credit" is a URL, which may, for example, be of the form "nonsecure://skype/buycredit.html". This is a request to retrieve the page "buycredit.html" from the server "skype", so that the page "buycredit.html" may be displayed to the user 106 in the web browser 130. This request does not begin with the standard "http://", but uses a marker string "nonsecure". A request such as "nonsecure://skype/buycredit.html" has the same functionality as a standard HTTP request, but the string "nonsecure" allows the client 112 to intercept the request and determine what action to take. In other words, "nonsecure" acts as a marker for the client 112 to use when intercepting requests. When the client 112 sees an attempt to make a request using "nonsecure", the client 112 knows that the request does not contain sensitive information, and that the request can be sent to the Skype backend server 122 (a further marker is also used, "secure", as will be described hereinafter).

At step S10, the client 112 wraps the "nonsecure" request message into a Skype proprietary communication protocol message and this is sent to the Skype backend server 122. On receipt of the message, the Skype backend server 122 unwraps the "nonsecure" request from the Skype proprietary communication protocol. For security and maintainability reasons, the requests only contain references to arbitrary services, not actual server addresses and ports. For example, the request "nonsecure://skype/buycredit.html" only contains a reference to a server "skype", and not an actual server address. The Skype backend server 122 therefore needs to resolve an arbitrary reference to a service name into a web server address. This is achieved by maintaining a table of correspondence between services and server addresses. Only the Skype backend server 122 maintains the mapping table between references and server addresses. The Skype backend 122 resolves the message from the client 112 to obtain the web server address. For example, the reference to "skype" in "nonsecure://skype/buycredit.html" may be resolved to "http://webstore.skype.com". The Skype backend server 122 then constructs a new HTTP request using the resolved address and the rest of the "nonsecure" request, resulting in, for example, "http://webstore.skype.com/buycredit.html".

This HTTP request is forwarded to the resolved location of the Skype web application 124 in the form of the above HTTP Get request at step S11, and the requested page is returned by the Skype web application 124 in step S12 in the form of HTML. The Skype backend 122 wraps the HTML response from the Skype web application in the Skype protocol and forwards the page to the client 112 in step S13, and this is then unwrapped from the Skype protocol and sent to the web browser 130 in step S14, and subsequently displayed to the user 106 in step S15.

In step S16, the user 106 views the page in the web browser 130 window and clicks on a link which may be labelled "Get Started". This link may be, for example, a link to the URL "nonsecure://skype/getstarted.html". The client 112 intercepts the web browser's attempt to make a "nonsecure" request (a type of HTTP Get request) to navigate to the linked webpage at step S17. The client 112 wraps the "nonsecure" request message into a Skype proprietary communication protocol message and this is sent to the Skype backend 122 in step S18. The Skype backend 122 unwraps the message and resolves the message from the client 112 to obtain the web server address in a similar manner to that described above with reference to step S10. The Skype backend 122 then creates a HTTP request from the resolved web server address and the unwrapped "nonsecure" request, for example "http://webstore.skype.com/getstarted.html". The HTTP request is forwarded to the resolved address of the Skype web application 124 in step S19. The Skype web application 124 returns the webpage "getstarted.html" to the Skype backend 122 in step S20, which wraps the response in the Skype protocol and forwards it to the client 112 in step S21, and this is unwrapped and passed to the web browser 130 window in step S22 and displayed to the user 106 in step S23.

The page displayed to the user 106 comprises a form to enter initial payment information. In step S24, the user 106 views the page and fills in the initial payment information, such as a billing address, email address and payment method and clicks "next". The "next" button is associated with a URL, which may be, for example, "nonsecure://skype/initialform.html". The web browser generates a type of HTTP Post request including the information entered into the form, such as "nonsecure://skype/initialform.html?address=x&method=y" (where "address=x" and "method=y" represents exemplary information entered by the user in the form), and transmits this message to the network 104 via the network port 105 in step S25. The HTTP Post request from the web browser 130 is received by the client 112 (which detects the use of the "nonsecure" marker) before it can reach the network port 105. The client wraps the HTTP Post request in a Skype protocol message and this message is forwarded to the Skype backend server 122 in step S26. Note that the client 112 may include other information in the message when it is wrapped in the Skype protocol, as discussed in more detail hereinafter with reference to FIG. 3.

The Skype backend server 122 unwraps and resolves the HTTP Post request message. For example, "nonsecure://skype/initialform.html?address=x&method=y" may be resolved to a HTTP message of the form "http://webstore.skype.com/initialform.html?address=x&method=y".
The Skype backend server 122 then sends the resolved request to the Skype web application 124 in step S27 to initiate the payment. The Skype web application 124 sends a message containing the initial payment information to the PSP web application 120 in step S28 to initiate the payment at the PSP. In step S29 the PSP web application 120 processes the information and returns the URL of a webpage containing the appropriate form for the payment method, such as a credit card information form. The Skype web application 124 receives the URL and creates a redirect header. The redirect header is sent to the Skype backend 122 in step S30.

The Skype backend server 122 resolves the address from the redirect header and sends a request to the PSP web application 120 to obtain the required webpage in step S31. The PSP web application 120 then returns the webpage containing the form for the payment details (such as credit card information) in step S32. This webpage is subsequently forwarded to the client 112 using the Skype protocol in step S33, unwrapped and passed to the web browser 130 in step S34, and displayed to the user 106 in step S35.

As a result of the procedure outlined in FIG. 2B, the user 106 has been presented with a form in the web browser 130, into which the user can enter credit card payment information. This payment information is sensitive, and therefore must be handled in a secure manner. The method in which this is performed can be seen with reference to FIG. 2C.

In step S36, the user 106 enters the payment information (for example credit card number, expiry date or other information) into the HTML form presented in the web browser window and clicks a "Submit" button. The "Submit" button is associated with a URL, which may be, for example, "secure://somepsp/creditcardform.html". The web browser 130 then generates a type of HTTP Post request using a marker "secure" containing the payment information (in the form of postData) and the URL above in step S37. This HTTP Post request may be, for example, "secure://somepsp/creditcardform.html?cardno=1234&expirydate=01012010" (where "cardno=1234" and "expirydate=01012010" represents exemplary credit card information entered in the form. Note also that this is a POST request represented in GET notation for ease of reading). The HTTP Post request from the web browser 130 is intercepted by the client 112, and prevented from being sent into the network 104. In particular, the client detects the marker "secure". This not only indicates to the client that it should intercept the message (as with "non-secure"), but also that the information in the message should be encrypted.

In step S38, the payment information, in the form of post-Data from the HTTP Post request, is encrypted using the public key of the PSP (provided to the client as outlined above with regards to FIG. 2A). The encryption is performed using a standard encryption algorithm as are known in the art. For example, if the postData were to comprise information such as "cardno=1234" and "expirydate=01012010", this is encrypted to form a new HTTP Post request with, e.g., "payload=34214123ddasdas". The client then creates a new HTTP Post request with the encrypted payload, for example "secure://somepsp/creditcardform.html?payload=34214123ddasdas".

The client 112 then wraps the HTTP Post request including the encrypted payment information in the Skype protocol format. In addition, the client 112 includes further information in the Skype protocol message. The further information may include user information, such as the user's Skypename and the version of the client 112 they are running, and context information containing fraud-related information about the request context, such as the identity of the terminal and the user. The Skype protocol message is forwarded to the Skype backend server 122 from the client 112 in step S39.

Providing user information and context information in the Skype protocol message gives the advantage of additional security. This is because, in the case of ordinary Web access, it is easy to conceal the identity of the actual terminal that a request originates from, and this often happens unintentionally on the part of the user (due to the use of proxies). However, the information in the Skype protocol message ties the request to a specific terminal, which can allow for the use of greater fraud detection mechanisms. Furthermore, the client 112 already knows the identity of user, and this information can therefore be passed to the PSP web application without having to prompt the user for an additional username and password.

The Skype backend 122 receives the Skype protocol message containing the encrypted payment information. The Skype backend 122 unwraps the Skype protocol message to leave the HTTP Post request comprising the encrypted payment information. The Skype backend 122 resolves the reference contained in the request to the server address of the PSP proxy 118, for example resolving the reference to "somepsp" to "http://www.psp.com". The Skype backend 122 then creates a new HTTP Post request message by combining the resolved server address of the PSP proxy 118 with the encrypted payload from the "secure" message. For example, this may create a HTTP Post request such as http://www.psp.com/creditcardform.html?payload=34214123ddasdas. This HTTP Post request is sent from the Skype backend 122 to the PSP Proxy 118 in step S40. It should be noted that the Skype backend 122 is not aware at any point of the actual contents of the request message. It does not decrypt the information, but merely "repackages" it into a new message. The Skype backend 122 therefore does not require PCI compliance. Furthermore, the Skype backend 122 does not store the payment information, and is therefore not a target for hackers.

Figure 3:
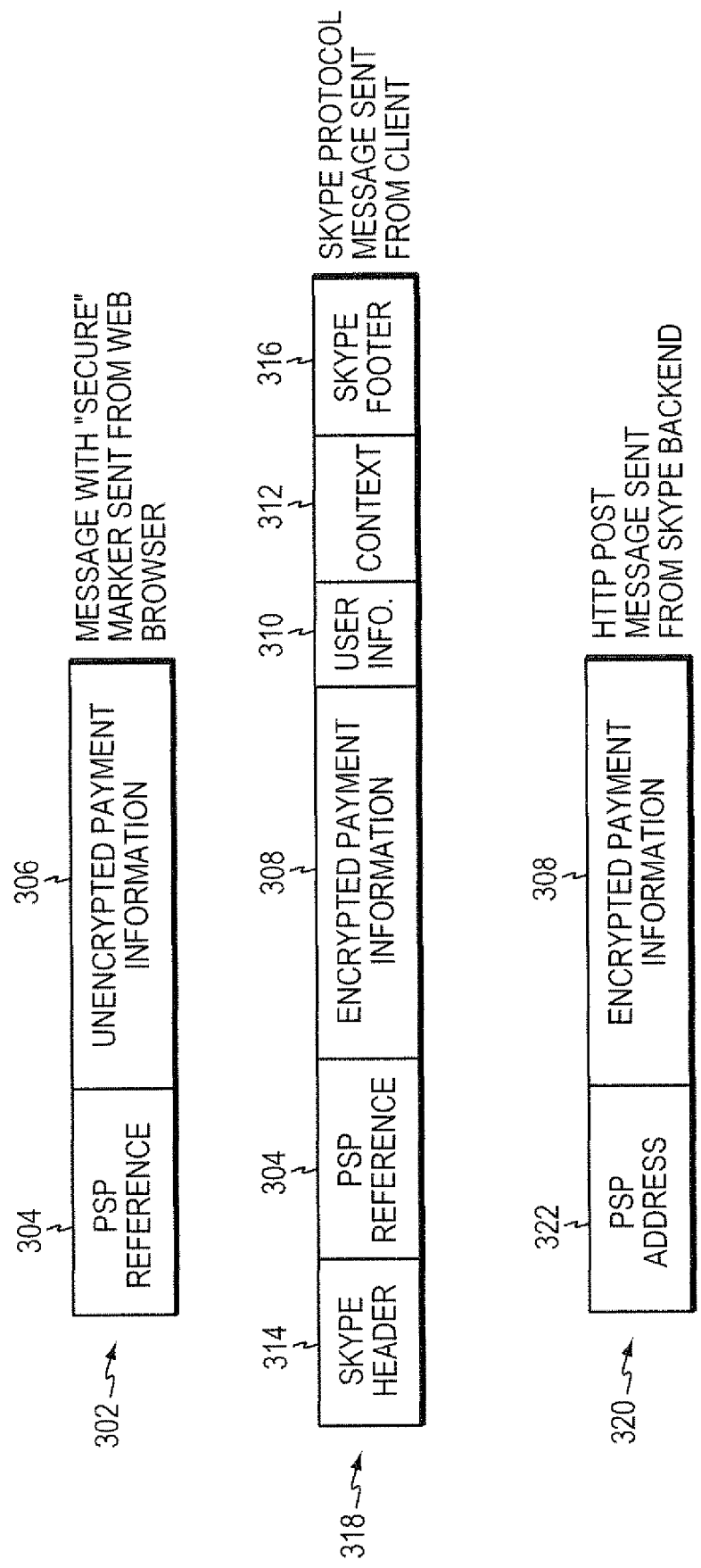
FIG. 3 shows the structure of the messages sent in the secure transfer of payment information.

The operation performed in steps S37, S39 and S40 can be seen further illustrated in FIG. 3, which shows an example of the structure of the messages received and sent in these steps. This shows the HTTP Post request 302 using the "secure" marker from the web browser 130, comprising the reference to the PSP 304 and the unencrypted postData 306, as received at the client 112. The postData (the payment information) is encrypted to produce the encrypted payment information 308. The encrypted payment information 308, the reference to the PSP 304, user information 310, and context 312 are wrapped between a Skype protocol header 314 and Skype protocol footer 316 to form the Skype protocol message 318. The Skype protocol message 318 is sent to the Skype backend 122, where it is unwrapped and the PSP reference 304 resolved to form an HTTP Post request 320 comprising the server address of the PSP 322 and the encrypted payment information 308.

Referring again to FIG. 2C, in step S41 the encrypted payment information in the HTTP Post request is decrypted by the PSP proxy 118 to obtain the original payment information entered by the user 106. The decrypted payment information is then sent to the PSP web application 120 in step S42 in the form of a HTTP Post request containing the decrypted payment information as postData and the URL of the PSP web application.

The PSP web application 120 processes the payment information from the user 106. If, following the processing of the payment information, the payment is completed, then the operation shown in FIG. 2D is performed. If, on the other hand, the payment is not yet completed, then the operation shown in FIG. 2E is performed.

Reference is first made to FIG. 2D, which, as mentioned above, shows the case in which the payment has been completed. In step S43, the PSP web application 120 issues a redirect header in response to the completed payment. The redirect header is received at the PSP proxy 118 and forwarded without any changes to the Skype backend 122 in step S44. The Skype backend 122 processes the redirect header, and, in step S45, sends an HTTP Get request to the URL of the Skype web application 124 referred to in the redirect header. The Skype web application 124 returns a HTML webpage to the Skype backend 122 in response in step S46. The HTML webpage is then forwarded to the client 112 in step S46, and onto the web browser 130 in step S48. Finally, the user 106 is displayed the results of the transaction in the web browser window in step S49.

Figure 2C:
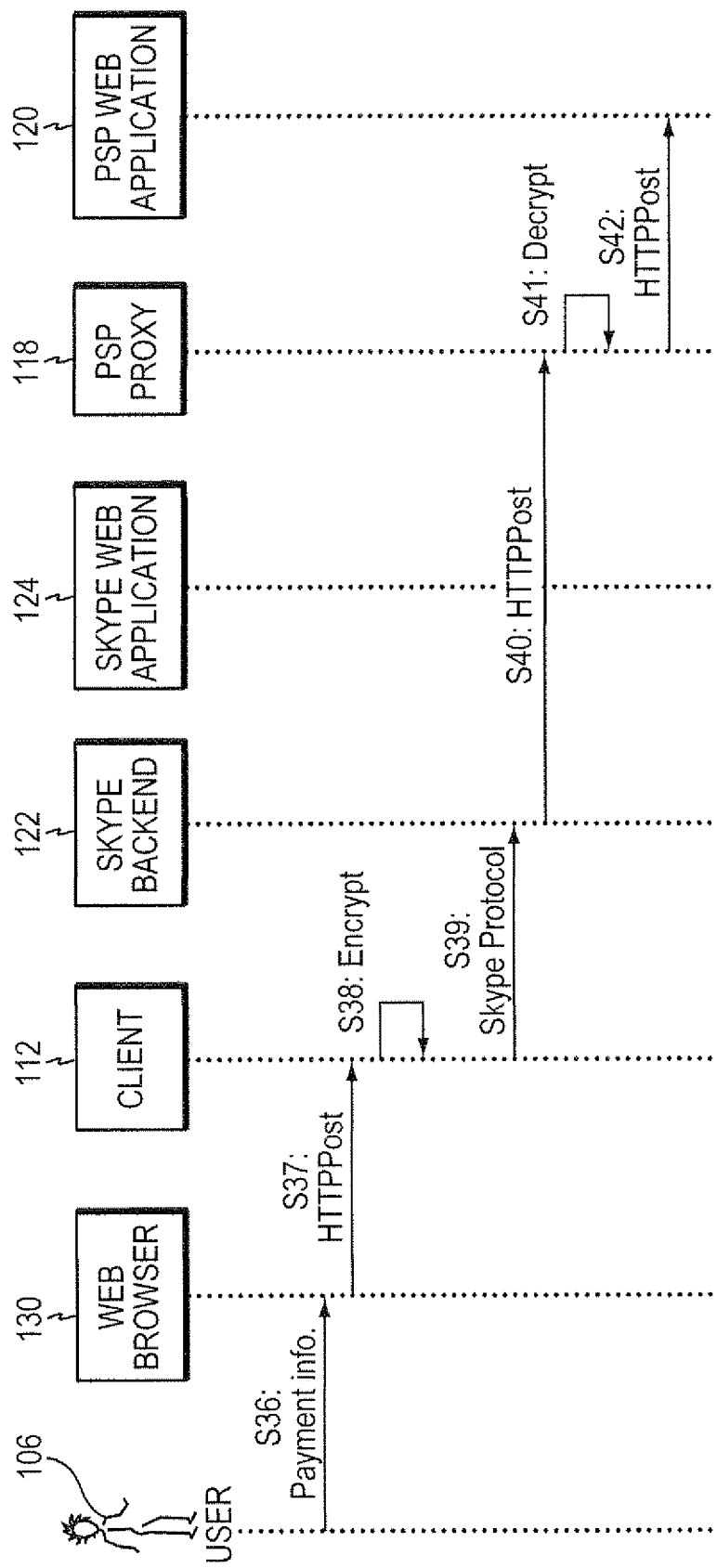
FIG. 2C shows the messages exchanged in the system of FIG. 1 for the secure transfer of payment information.
Figure 2D:
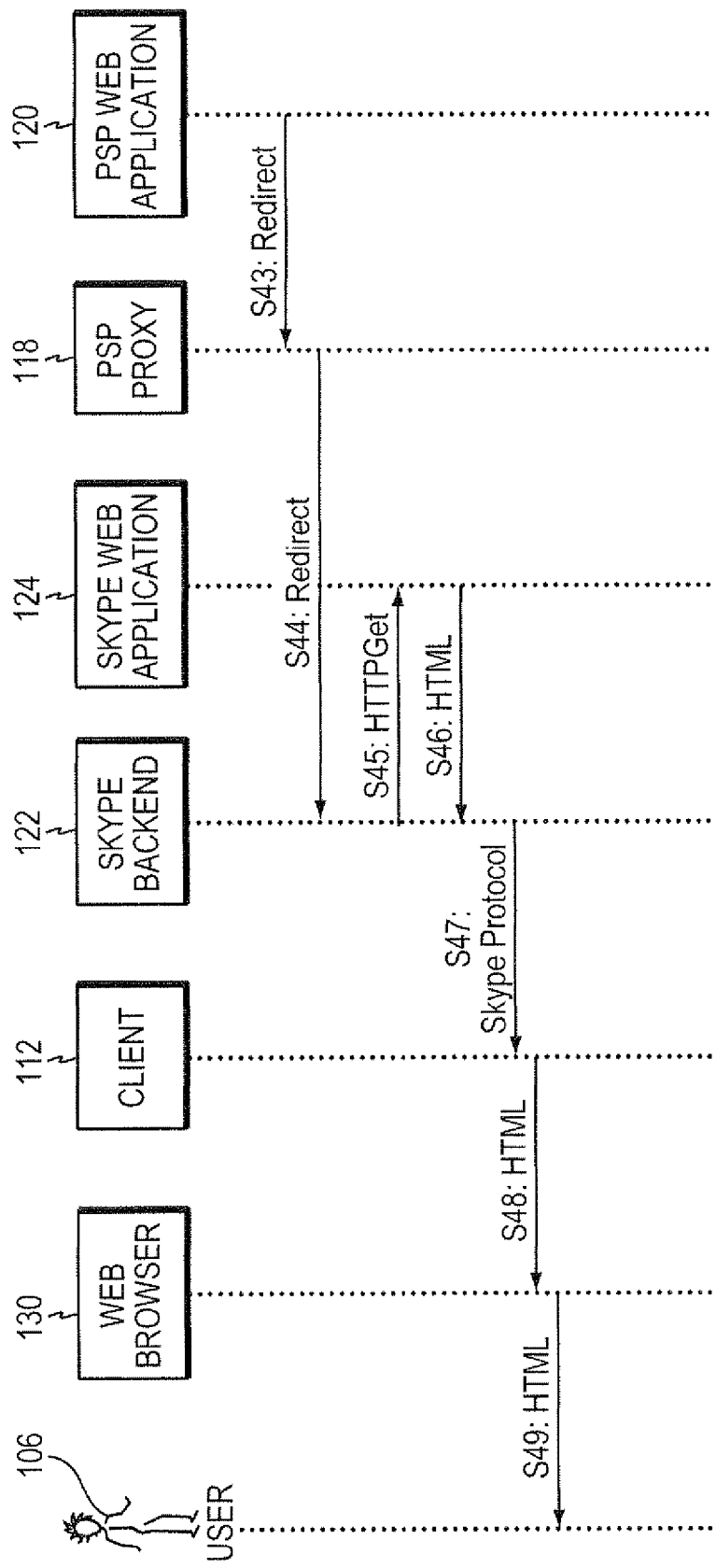
FIG. 2D shows the messages exchanged in the system of FIG. 1 for the transmission of a completed payment result.
Figure 2E:
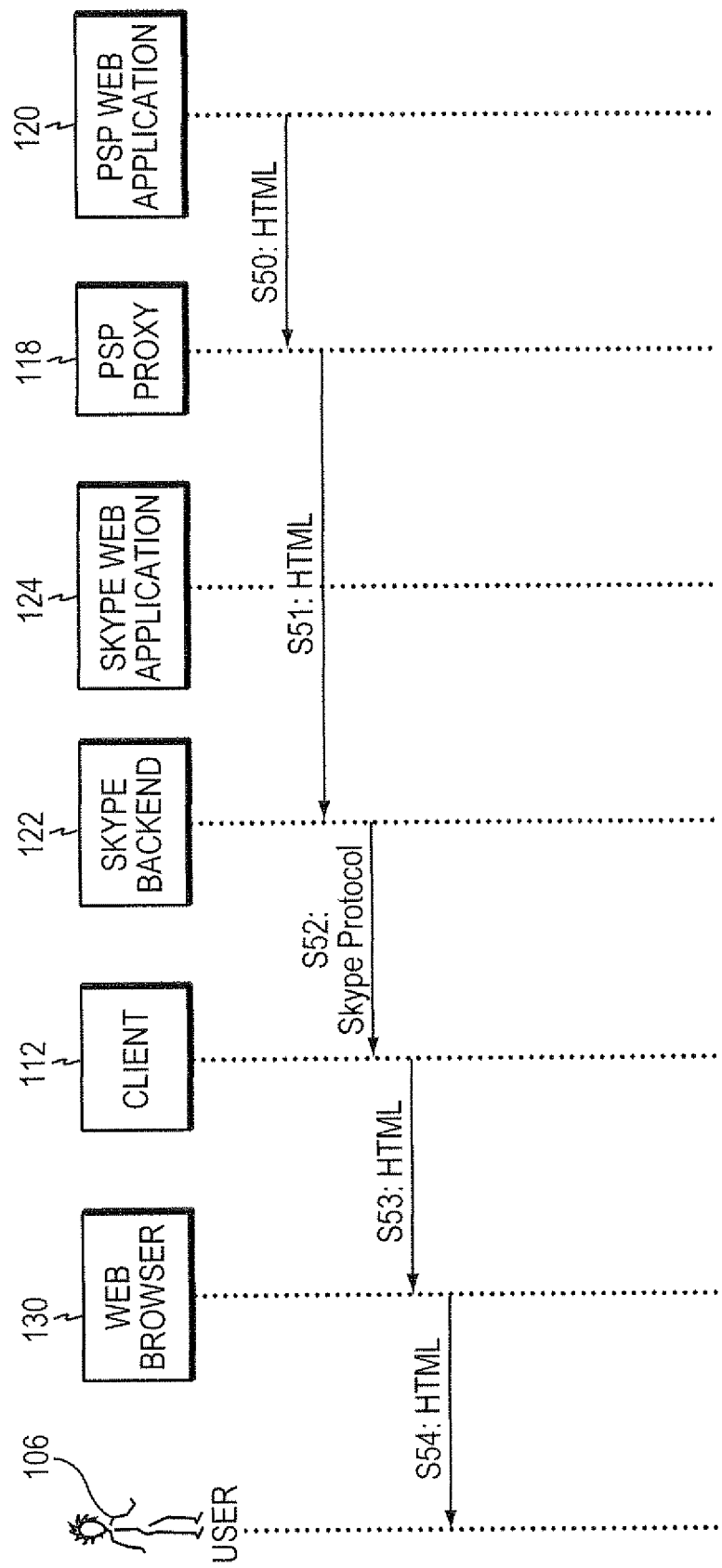
FIG. 2E shows the messages exchanged in the system of FIG. 1 for the transmission of a uncompleted payment result.

Reference is now made to FIG. 2E, which, as mentioned above, shows the case in which the payment has not yet been completed. This may occur if the user has entered their credit card details incorrectly, or in the case that the PSP requests additional information for fraud control purposes. In this instance the PSP web application 120 generates a HTML webpage to be displayed to the user 106. The HTML page is sent to the PSP proxy 118 in step S50, and forwarded unaltered to the Skype backend 122 in step S51. The Skype backend 122 forwards the HTML webpage to the client 112 in step S52, and onto the web browser 130 in step S53. Finally, the user 106 is displayed the HTML page from the PSP web application 120 in the web browser window in step S54.

Figure 4:
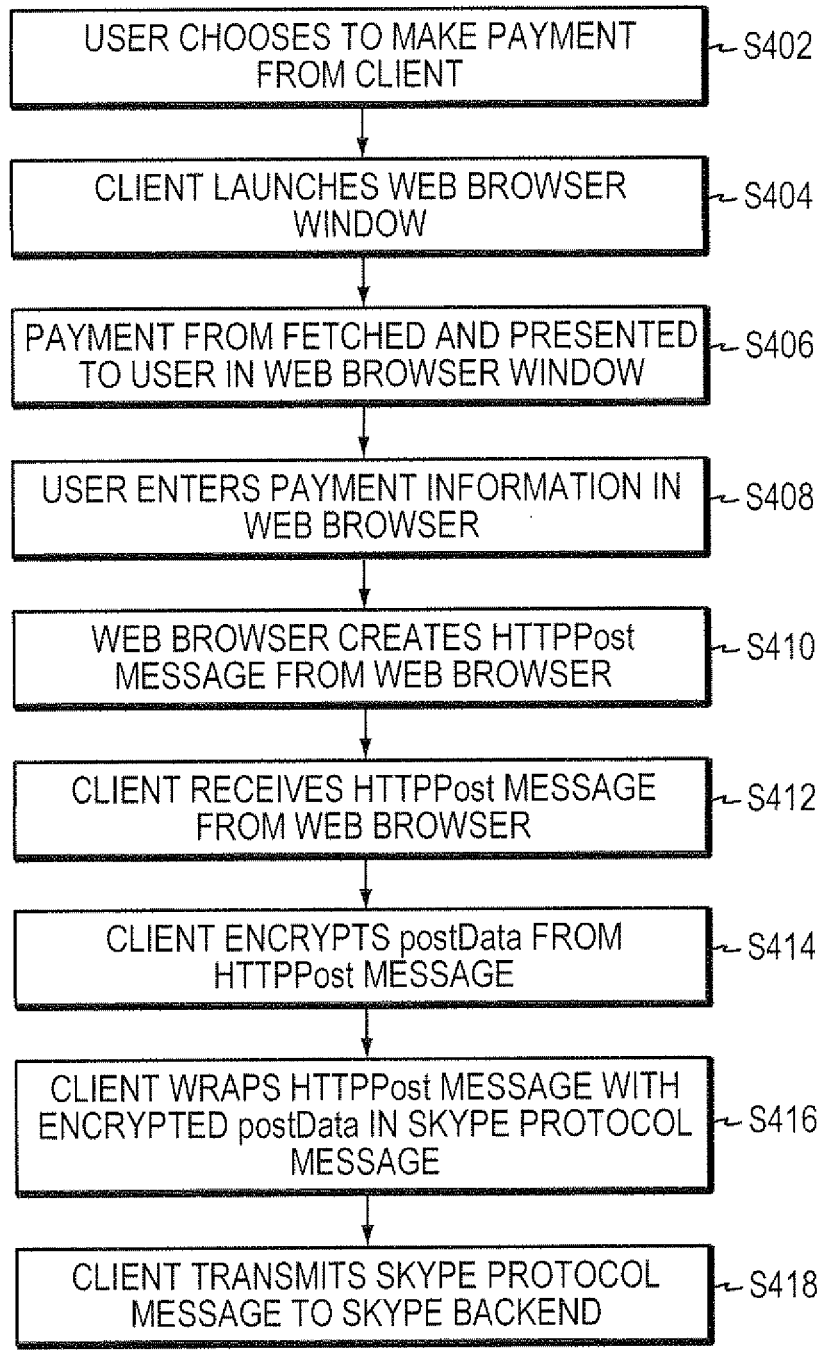
FIG. 4 shows a flowchart outlining the operations performed at the user terminal.

FIG. 4 shows a flowchart summarising the operations performed at the user terminal 102. In step S402, the user 106 chooses to make a payment from within the client program 112. In response to this the client 112 opens a web browser 130 within the client user interface at step S404. A payment details form is fetched from the PSP 116, and is presented to the user in step S406 in the web browser 130. In step S408 the user 106 enters the payment information into the form in the web browser 130. The web browser 130 creates a HTTP Post request with the "secure" marker including the payment information (302 as shown in FIG. 3) and attempts to send this into the network 104 via the network port 105 in step S410. The client 112 detects the "secure" marker and intercepts the HTTP Post request from the web browser 130 in step S412, thereby preventing it from being sent into the network 104. In step S414, the client 112 encrypts the payment information from the HTTP Post request. Then, in step S416, the client wraps the HTTP Post request with the encrypted payload in a Skype proprietary protocol message (318 in FIG. 3). Finally, in step S418, the client transmits the Skype protocol message containing the encrypted payment information to the Skype backend server 122.

Figure 5A:
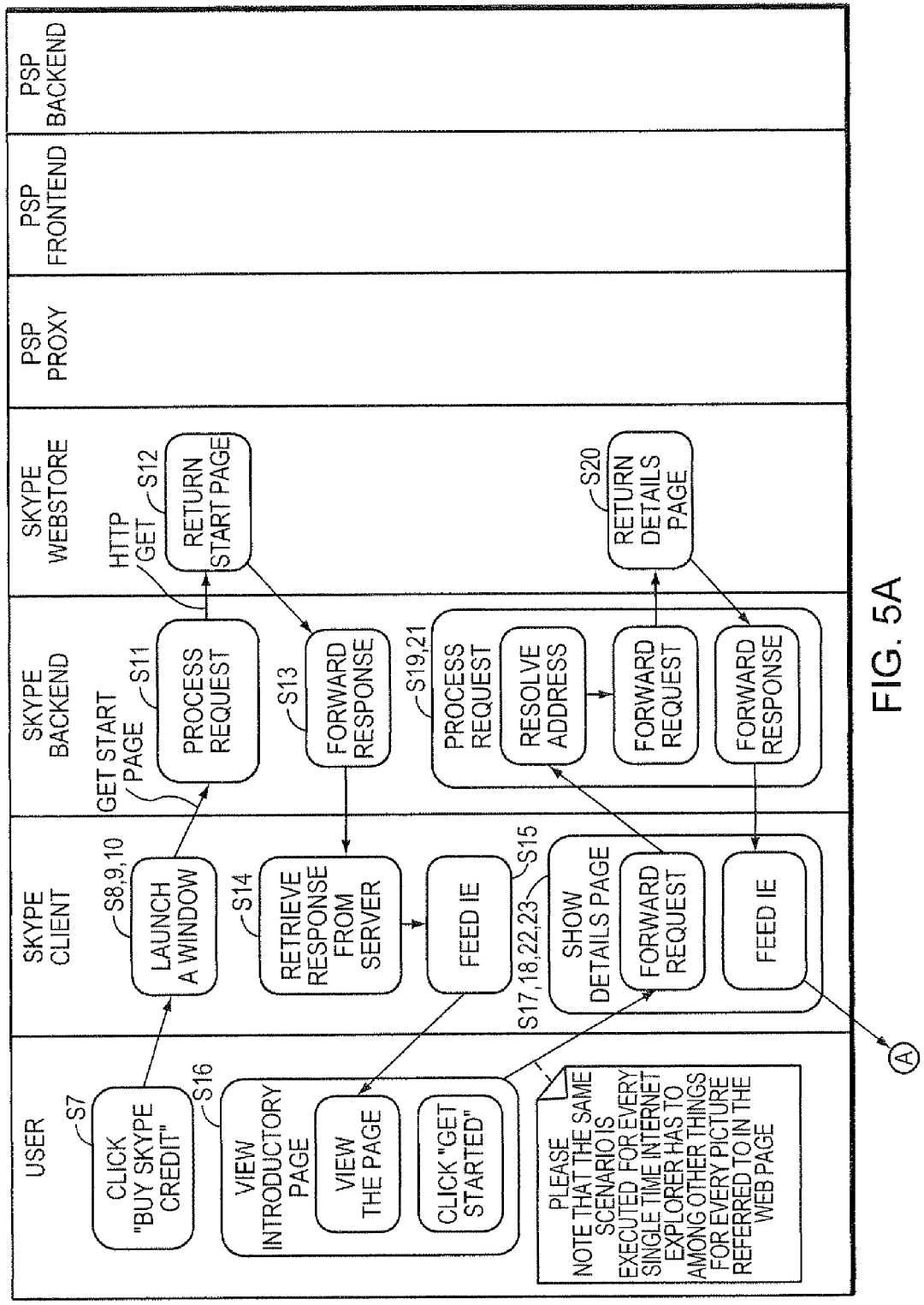
FIGS. 5A-5C show the page flow for the operations performed in FIG. 2B-2D.
Figure 5B:
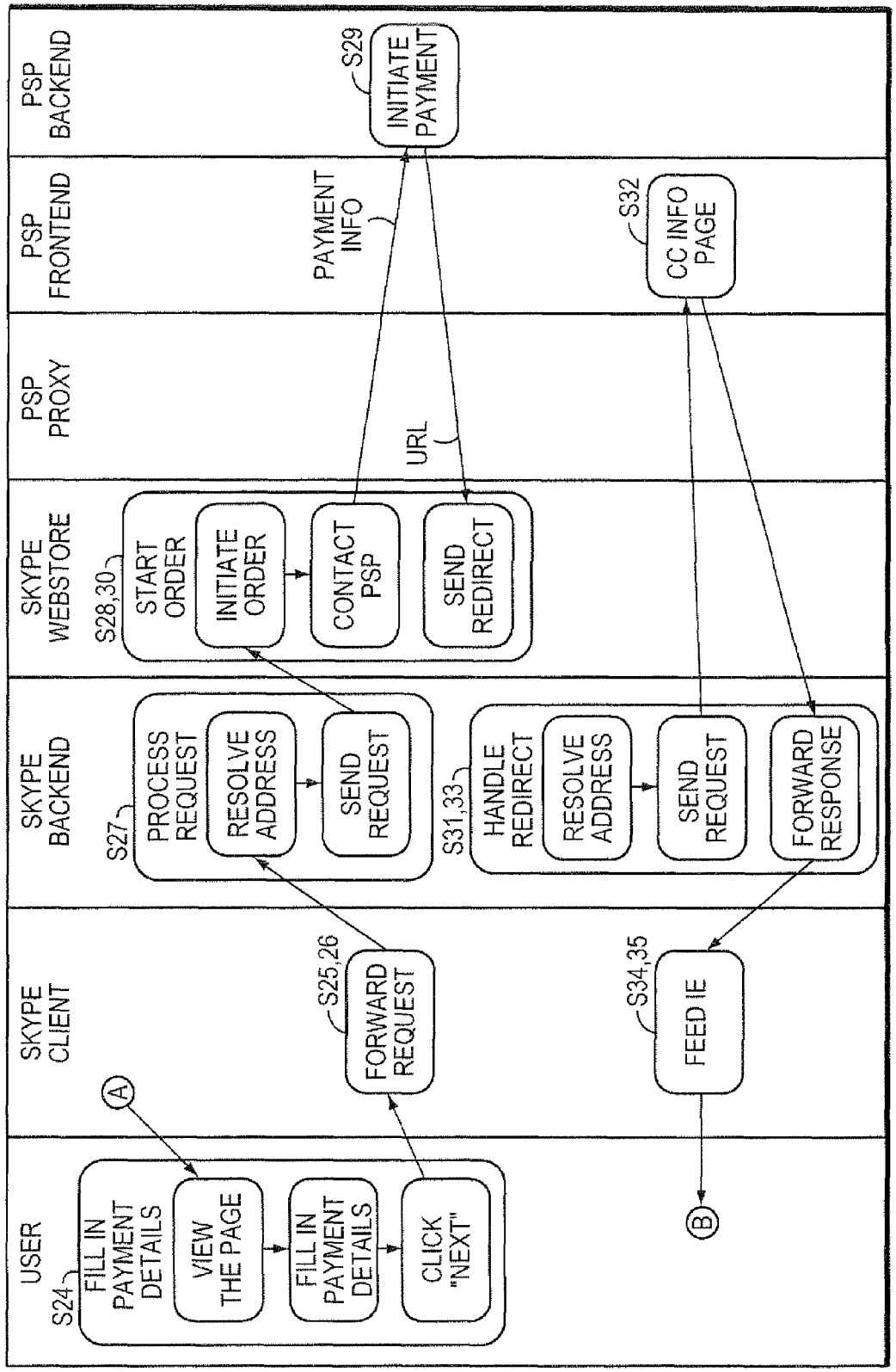
Figure 5C:
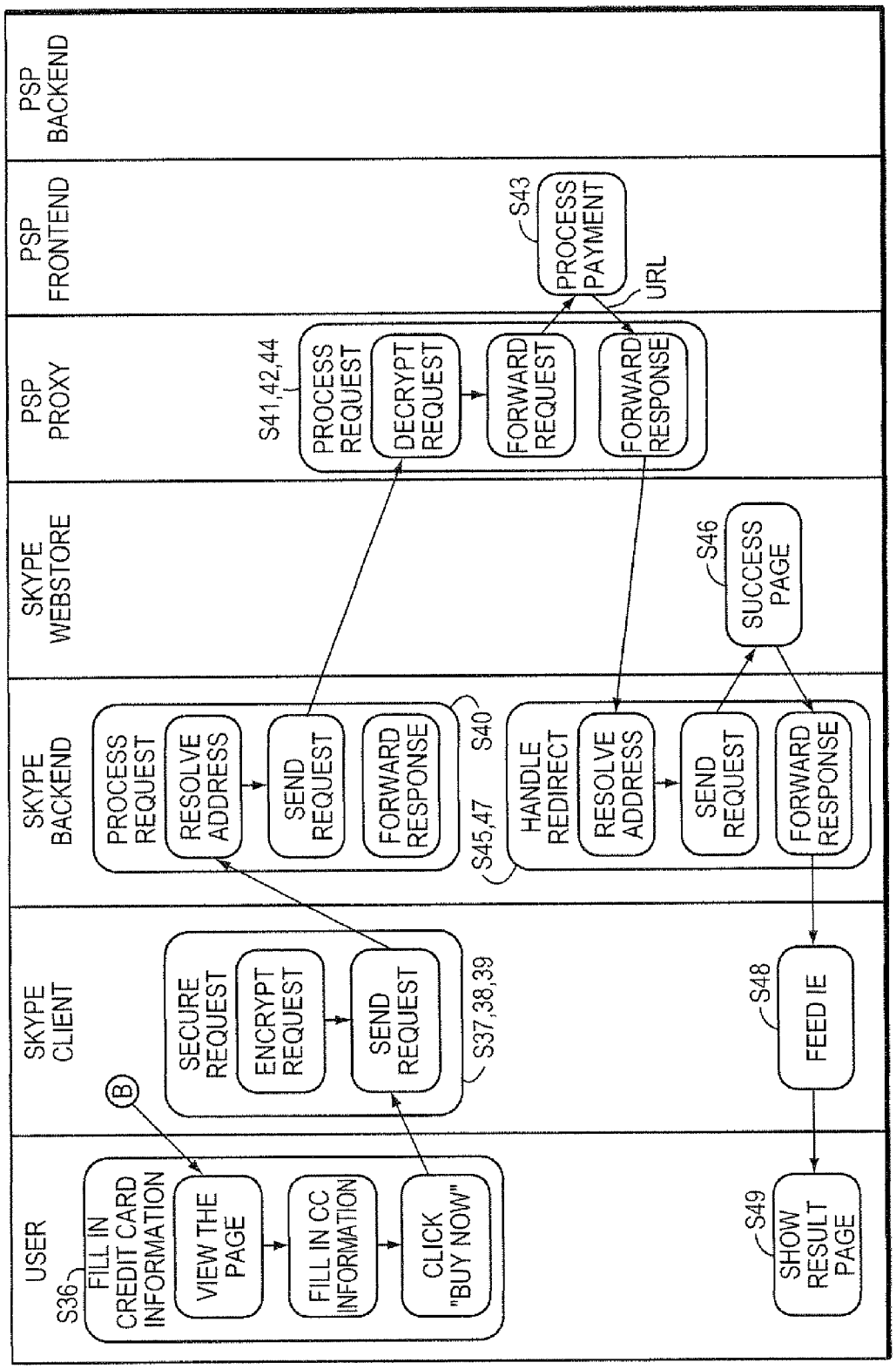

FIGS. 5A-5C show the page flow for the operations shown in FIGS. 2B-2D. The step numbers shown in FIGS. 5A-5C correspond to those as shown in FIGS. 2B-2D. In FIGS. 5A-5C, "IE" refers to "Internet Explorer", which is an example of a type of web browser 130.

While this invention has been particularly shown and described with reference to preferred embodiments, it will be understood to those skilled in the art that various changes in form and detail may be made without departing from the scope of the invention as defined by the appendant claims.

What is claimed is:

1. A method comprising:
    receiving, using a browser, information at a user terminal;
    the browser generating a first message comprising the information using a first communication protocol for despatch over a communications network via a network port, the first message including an identifier of a first network entity;
    intercepting the first message at a client executed at the user terminal before the first message reaches the network port;
    determining whether the first message includes a nonsecure marker string or a secure marker string, the nonsecure marker string reciting the term nonsecure, and the secure marker string reciting the term secure;
    encrypting the first message if the first message includes the secure marker string;
    wrapping the first message in a second message of a second communication protocol used for transmitting messages between the client and a second network entity, and including user information with the second message if it is determined that the first message includes the secure marker string; and
    transmitting the second message to the second network entity over the communications network effective to cause the second network entity to unwrap the first message from the second message, translate the identifier of the first network entity to a network address of the first network entity, and transmit the first message to the first network entity over the communications network.

2. A method according to claim 1, further comprising receiving the first message at the first network entity from the second network entity after transmitting the second message to the second network entity.

3. A method according to claim 2, further comprising decrypting the information in the first message, after it is received at the first network entity.

4. A method according to claim 1, wherein the encrypting is performed using an encryption key provided by the first network entity.

5. A method according to claim 4, further comprising periodically transmitting, by the first network entity, the encryption key to the second network entity.

6. A method according to claim 1, further comprising:
    transmitting, by the first network entity, a third message to the second network entity responsive to intercepting the first message effective to cause the second network entity to fetch a webpage from a server, wrap the webpage in a fourth message of the second communication protocol, and transmit the fourth message to the client over the communications network;
    receiving, at the client, the fourth message from the second network entity;
    unwrapping the webpage from the fourth message at the client and passing the webpage to the browser; and
    displaying the webpage in the browser.

7. A method according to claim 6, wherein the third message is a redirect message.

8. A method according to claim 1, wherein the wrapping comprises adding a header and a footer to the first message.

9. A method according to claim 1, wherein the first communication protocol is a hypertext transfer protocol.

10. A method according to claim 1, wherein the first network entity is a payment service provider.

11. A method according to claim 1, wherein the communications network is the Internet.

12. A method according to claim 1, wherein the second network entity is a backend server.

13. A method according to claim 1, wherein the information is payment information.

14. A system comprising:
- a browser executed at a user terminal, the browser configured to receive information and generate a first message comprising the information using a first communication protocol for despatch over a communications network via a network port, the first message including an identifier of a first network entity;
- at least a memory and a processor to implement a client executed at the user terminal, the client configured to:
- intercept the first message before the first message reaches the network port;
- determine whether the first message includes a non-secure nonsecure marker string or a secure marker string, the nonsecure marker string comprising a string that recites nonsecure, and the secure marker string reciting the term secure;
- encrypt the first message if the first message includes the secure marker string;
- wrap the first message in a second message of a second communication protocol used for transmitting messages between the client and a second network entity, and include user information with the second message if it is determined that the first message includes the secure marker string; and
- transmit the second message to the second network entity over the communications network effective to cause the second network entity to unwrap the first message from the second message, translate the identifier of the first network entity to a network address of the first network entity, and transmit the first message to the first network entity over the communications network.

15. A system according to claim 14, wherein the first network entity is further configured to receive the first message from the second network entity after transmitting the second message to the second network entity.

16. A system according to claim 15, wherein the first network entity is further configured to decrypt the information in the first message, after it is received at the first network entity.

17. A system according to claim 14, wherein the first network entity is further configured to decrypt the information in the first message using an encryption key provided by the first network entity.

18. A system according to claim 17, wherein the first network entity is further configured to periodically transmit the encryption key to the second network entity.

19. A system according to claim 14, wherein the first network entity is further configured to transmit a third message to the second network entity responsive to intercepting the first message.

20. A system according to claim 19, wherein the transmitting the third message to the second network entity is effective to cause the second network entity to fetch a webpage from a server, wrap the webpage in a fourth message of the second communication protocol, and transmit the fourth message to the client over the communications network.

21. A system according to claim 20, wherein the client is further configured to unwrap the webpage from the fourth message and pass the webpage to the browser.

22. A system according to claim 21, wherein the browser is further configured to display the webpage.

23. A system according to claim 19, wherein the third message is a redirect message.

24. A system according to claim 14, wherein the client is configured to wrap the first message by adding a header and a footer to the first message.

25. A system according to claim 14, wherein the first communication protocol is a hypertext transfer protocol.

26. A system according to claim 14, wherein the first network entity is a payment service provider.

27. A system according to claim 14, wherein the communications network is the Internet.

28. A system according to claim 14, wherein the second network entity is a backend server.

29. A system according to claim 14, wherein the information is payment information.

30. A user terminal comprising:
- a browser executed at the user terminal, the browser configured to receive information and generate a first message comprising the information using a first communication protocol for despatch over a communications network via a network port, the first message including an identifier of a first network entity; and
- at least a memory and a processor to implement a client executed at the user terminal, the client configured to:
- intercept the first message before the first message reaches the network port;
- determine whether the first message includes a non-secure nonsecure marker string or a secure marker string, the nonsecure marker string reciting nonsecure, and the secure marker string reciting the term secure;
- encrypt the first message if the first message includes the secure marker string; wrap the first message in a second message of a second communication protocol used for transmitting messages between the client and a second network entity, and include user information with the second message if it is determined that the first message includes the secure marker string; and transmit the second message to the second network entity over the communications network.

31. A computer readable hardware storage medium having program code stored thereon that when loaded into a computer controls the computer to carry out the method of claim 1.

* * * * *